US008233618B2

(12) United States Patent  (10) Patent No.: US 8,233,618 B2
Hui  (45) Date of Patent: Jul. 31, 2012

(54) METHOD AND SYSTEM FOR GENERATING A PAIR OF PUBLIC KEY AND SECRET KEY

(76) Inventor: Sai Chuen Hui, Shenzhen (CN)

( * ) Notice: Subject to any disclaimer, the term of this patent is extended or adjusted under 35 U.S.C. 154(b) by 1097 days.

(21) Appl. No.: 11/881,299

(22) Filed: Jul. 25, 2007

(65) Prior Publication Data

US 2009/0046853 A1    Feb. 19, 2009

(51) Int. Cl.
*H04L 9/30* (2006.01)
(52) U.S. Cl. ............................. 380/30; 380/44
(58) Field of Classification Search .............. 380/44, 380/28–30
See application file for complete search history.

(56) References Cited

U.S. PATENT DOCUMENTS

2003/0108193 A1    6/2003  Sotoodeh

FOREIGN PATENT DOCUMENTS

| EP | 0482233 B1 | 8/1995 |
| JP | 2004253437 | 9/1992 |
| WO | WO-02/45313 A1 | 6/2002 |

*Primary Examiner* — Gilberto Barron, Jr.
*Assistant Examiner* — Simon Kanaan
(74) *Attorney, Agent, or Firm* — Raymond Y. Chan; David and Raymond Patent Firm (57) ABSTRACT

A method of generating a pair of public key and secret key, includes the steps of selecting a public key; selecting a secret key; computing a heavy prime number in responsive to the public key and the secret key; factoring the heavy prime number by selecting first and second prime numbers in condition that a sum of said first and second prime numbers equals to the heavy prime number; and pairing the secret key with the public key in term of the heavy prime number as a bridge to generate a unique combination between the secret key with the public key. Therefore, the secret key is definitively undetermined by conjecturing the public key even though the public key is known.

15 Claims, 5 Drawing Sheets

| Message Source | 人 | | | 生 | | | | 幾 | | | 何 | | |
|---|---|---|---|---|---|---|---|---|---|---|---|---|---|
| Spelling (S) | r | e | n | 2 | s | h | e | n | g | 1 | j | i | 3 | h | e | 2 |
| Information Set (A) | 168 | 102 | 174 | 2 | 230 | 160 | 154 | 250 | 326 | 1 | 116 | 120 | 3 | 120 | 114 | 2 |

FIG. 5

| s | 。 | ' | : | ; | ! | ? | … | — | ( | ) | " | " | ' | ' | ≪ | ≫ |
|---|---|---|---|---|---|---|---|---|---|---|---|---|---|---|---|---|
| $q_i$ | 3 | 5 | 7 | 11 | 13 | 17 | 19 | 23 | 29 | 31 | 41 | 43 | 47 | 53 | 59 | 61 |

| s | a | b | c | d | e | f | g | h | i | j | k | l | m |
|---|---|---|---|---|---|---|---|---|---|---|---|---|---|
| $q_i$ | 67 | 71 | 73 | 79 | 83 | 89 | 97 | 101 | 107 | 109 | 113 | 127 | 131 |

| s | n | o | p | q | r | s | t | u | v | w | x | y | z |
|---|---|---|---|---|---|---|---|---|---|---|---|---|---|
| $q_i$ | 137 | 139 | 149 | 151 | 157 | 163 | 167 | 173 | 179 | 181 | 191 | 193 | 197 |

FIG. 9 (Goldbach's conjecture number storage tank)

| w | $Z_w(w)$ | p+q |
|---|---|---|
| 168 | 26 | 5+163, 11+157, 17+151, 19+149, 29+139, 31+137, 37+131, 41+127, 59+109, 61+107, 67+101, 71+97, 79+89, ……. |

| w | Numbers of prime number $P_n$, $n = \pi\sqrt{w}$ | $Z_w(w)$ | Lower boundary $Z_w'(w)$ | $p + q$ |
|---|---|---|---|---|
| 36 | 2, 3, 5 | 8 | 3 | 5+31, 7+29, 13+23, 17+19; 19+17, 23+13, 29+7, 31+5 |

FIG. 6

| q = w−p | | 31 | 29 | 23 | 19 | 17 | 13 | | 7 | 5 | | | | | | | | | |
|---|---|---|---|---|---|---|---|---|---|---|---|---|---|---|---|---|---|---|---|
| p | 3 | 5 | 7 | 11 | 13 | 17 | 19 | 23 | 29 | 31 | 37 | 41 | 43 | 47 | 53 | 59 | 61 | 67 | 71 |
| k | 1 | 2 | 3 | 4 | 5 | 6 | 7 | 8 | 9 | 10 | 11 | 12 | 13 | 14 | 15 | 16 | 17 | 18 | 19 |

FIG. 7

| | | r |
|---|---|---|
| Message source set S | $s_1, s_2, \ldots$ | |
| Prime number set Q | $q_1, q_2, \ldots$ | 157 |
| Cipher code string K | $k_1, k_2, \ldots$ | 2 |
| Information set A | $w_1, w_2, \ldots$ | 168 |

FIG. 8

METHOD AND SYSTEM FOR GENERATING A PAIR OF PUBLIC KEY AND SECRET KEY

BACKGROUND OF THE PRESENT INVENTION

1. Field of Invention

The present invention relates to cryptographic systems, and more particularly to a method and system for generating a pair of public key and secret key for cryptographic systems using identity-based information as public keys.

2. Description of Related Arts

Experts in Cryptography used to design and analyze a cipher by hunch and belief. Cryptography has become a field of science since 1949 when Sharmon published a theory regarding cryptographic system, so as to establish a theory foundation thereof. In 1976, the paper "New Directions in Cryptography" published by Diffie and Hellman led to a revolution in cryptography. It was the first time to demonstrate a confidential communication between the receiving end and sending end without secret keys transmission. This also opened a new era for public-key cryptography.

There are cryptographic systems, secret-key (or private-key) and pubic-key. In a secret-key cryptographic system, encryption is symmetric to decryption. It is so disadvantageous that before transmitting any encrypted document, a pre-transmitting cipher K for security transmission has to be used, which is usually infeasible.

In a public-key cryptographic system, pubic-key can be separated with secret-key, and the receiving and sending terminals can transmit encrypted document without exchanging secret-keys in advance. Diffie and Hellman suggested using the complexity in computation to design an encrypted algorithm. They pointed out the np-problem, which cannot be solved in a definite time using a known technique. A cipher is designed by trapping an object into the complexity of a one-way function. This is the basic principle to design public-key cryptographic system. The security means security in computation. However, no function is proved one-way so far.

The most famous is RSA and applied for a U.S. patent, which was sold for twenty billion dollars in 1996. Its security concern is based on the difficulty in factorizing a big integral. It requires that modulus n=pq has to be big enough. So far, 130-digit numbers have been factorized. Based on security consideration, 154-digit numbers are not enough to provide high degree of security. The possibility is 50% when using Las Vegas algorithm to factorize n, and based on the theory of same-modulus attack, the same modulus n should not be shared between different users. RSA algorithm suffers its own disadvantage of same-phase property which should be changed by random combination or one-way transformation. In addition, circular attack generates stagnant point in RSA so that p and q cannot be too close, and encrypted index b and decrypted index a cannot be too small. Furthermore, RSA needs huge amount of random prime numbers and it is possible that a non-prime number can be mistakenly regarded as a prime number. Adopting two-time screening method to factorize n=pq, 106 integrals were factorized with hundreds of work stations in 1994.

In addition, ElGamal algorithm has the property of uncertainty which is widely applied in cryptographic agreements. Its security is based on the difficulty in discrete data but it can be solved by exhaustive search. Shanks algorithm is a method in compromise of time and space. There are also Rabin algorithm, Merkle-Hellman bag pack algorithm, Chor-Rivest algorithm, McEliece Algorithm, Ellipse curve cipher algorithm, Limited automation algorithm and Public-key algorithm based on identity. The above algorithms have their own advantages and limitations.

SUMMARY OF THE PRESENT INVENTION

A main objective of the present invention is to provide a method and system for generating a pair of public key and secret key, wherein the user may be given two sets of numbers, one of which is called a public key and the other is called a private key or a secret key. The method can be deciphered only by providing these two keys correctly and simultaneously. Even the public key is known by other people, the private key cannot be deciphered because of the complexity of the algorithm applied in the system and no statistically regularity therein.

Another objective of the present invention is to provide a method and system for generating a pair of public key and secret key, comprising a character spelling transformer which is adapted for transforming a non-English character into at least one English character; a character-digitalized transformer, wherein the English characters are transformed into a plurality of prime numbers; a cipher code string generator, wherein the prime number transformed from English characters are further complied into a plurality of cipher codes; a Goldbach's conjecture number storage tank in which a plurality of cipher codes generated by the cipher code string generator are stored; and an encryption device.

Another objective of the present invention is to provide a method and system for generating a pair of public key and secret key, wherein the working principle is to incorporate Goldbach's conjecture to solve a first order equation with four variables, which provides no leeway for people to decipher the cipher lock.

Another objective of the present invention is to provide a method and system for generating a pair of public key and secret key, wherein when the number of the public key is bigger than the private key, the computation in the method is stopped and the cryptographic system is frozen which will protect the cryptographic system from being attacked.

Another objective of the present invention is to provide a method and system for generating a pair of public key and secret key, wherein the user can set up a "police-alarming transformer" which simply adds a non-zero number before the public key. When this special-designed number is entered, the system alarms the police and shows the police where the money is withdrawn. When the user is forced to give his password i.e., public key to the robber, he can give the robber the special-designed password so that when the robber obtains the money from the ATM machine, the police can roughly locate and then effectively arrest the robber.

These and other objectives, features, and advantages of the present invention will become apparent from the following detailed description, the accompanying drawings, and the appended claims.

These and other objectives, features, and advantages of the present invention will become apparent from the following detailed description, the accompany drawings, and the appended claims.

DETAILED DESCRIPTION OF THE PREFERRED EMBODIMENT

Double-key cipher lock means that two keys are necessary to open a lock, such as one needs two keys to open a bank safe. This is one of the features of double-key cipher. It is different from double keys used separately in cryptography, and encryption on a main cipher lock.

Accordingly, the present invention provides a method of generating a pair of public key and secret key, comprising the steps of:

(1) Select a public key $p_1$, wherein the public key $p_1$ is a prime number.

(2) Select a secret key N, wherein the secret key N is larger than the public key $p_1$.

(3) Compute a heavy prime number w in responsive to the public key $p_1$ and the secret key N from the group $(N-p_1)$.

(4) Factor the heavy main number w by the steps of:
 (4.1) selecting a first prime number p; and
 (4.2) determining a second prime number q in responsive to the first prime number p in condition that a sum of the first and second prime numbers p, q equals to the heavy main number w, wherein each of the first and second prime numbers p, q is an odd prime number.

(5) Generate a cipher code string k from a cipher code set in response to the first and second prime numbers p, q, wherein the cipher code string k is an integral order number representing a corresponding combination of the first and second prime numbers p, q in an order manner.

(6) Pair the secret key N with the public key $p_1$ in term of the heavy prime number was a bridge to generate a unique combination between the secret key N with the public key $p_1$, such that the secret key N is definitively undetermined by conjecturing the public key $p_1$ even though the public key $p_1$ is known.

The present invention further provides a system for generating a pair of public key and secret key, wherein the system comprises a key provider, a computing device, and a cipher code generator.

The key provider provides the public key $p_1$ and the secret key N.

The computing device generates the heavy main number w in responsive to the public key $p_1$ and the secret key N from the group $(N-p_1)$, wherein the heavy main number w is factored into the first and second prime numbers p and q and is in such a manner that a sum of the first and second prime numbers p, q equals to the heavy main number w, wherein each of the first and second prime numbers p, q is an odd prime number.

The cipher code generator generates the cipher code string k from a cipher code set in response to the first and second prime numbers p, q, wherein the cipher code string k is an integral order number representing a corresponding combination of the first and second prime numbers p, q in an order manner, wherein the secret key N is paired with the public key $p_1$ in term of the heavy prime number was a bridge to generate a unique combination between the secret key N with the public key $p_1$, such that the secret key N is definitively undetermined by conjecturing the public key $p_1$ even though the public key $p_1$ is known.

Accordingly, this brand new double-key system based on the principle that every prime number N ($N \geq 9$) is the sum of three other prime numbers p, q and $p_1$, namely $N=p+q+p_1$ in which given $w=p+q$ and w is a non-prime number, N is called a private key and $p_1$ is called a public key. W is also called as a heavy main number and is an even number. Accordingly, the secret key N must be an odd number. In other words, the value of the heavy main number w is larger than that the first prime number p and is larger than that of the second prime number q. It is worth to mention that each of the secret key N, the public key p.sub.1, the heavy main number w, the first and second prime numbers p, q, and the cipher code string k is a non-zero positive integer.

With the change of w, the combinations of (p, q) are consequently changed. Because public key $p_1$ and private key N are known, and $p_1 < N$ has to be satisfied, if $p_1 \geq N$, computer computation will immediately stop. This feature can be applied for freezing the cipher, such as freezing the bank account, discovering theft and invalidating some messages. Therefore, in the step (2), when the secret key N is set with a value smaller than the public key $p_1$, a fault step is generated to indicate an error of the method. Accordingly, the system of the present invention further comprises an error indicator indicating there is an error for generating a heavy main number w when the secret key N is set with a value smaller than the public key $p_1$.

Based on above analysis, it is likely that many people use one identical cipher $p_1$, because their private key N and bank account number are kept confidential, and thus each person's cipher ($p_1$) does not have to be encrypted. Private key N can be adapted for personal identification and cipher. For example, there are 600 billion people in the world, given a $w=25 \times 10^6$, the number of prime number smaller than w is:

$$n = [\pi \sqrt{w} - 1] = [\pi \sqrt{25 \cdot 10^6} - 1] = [\pi(5000) - 1] = 668$$

and the number of ciphers are:

$$N * [\pi \sqrt{w} - 1] = \frac{w-8}{2} [\pi \sqrt{w} - 1]$$
$$= \frac{25 \cdot 10^6 - 8}{2} \times 668$$
$$\approx 83.5 \times 10^8 > 65 \times 10^8$$

which means given $w=25 \times 10^6$ to build double-key cipher system is enough to satisfy people all over the world so that each person has a personal identification or cipher. In other words, the heavy prime number w means the relatively huge combination of the numbers.

Figure 4:
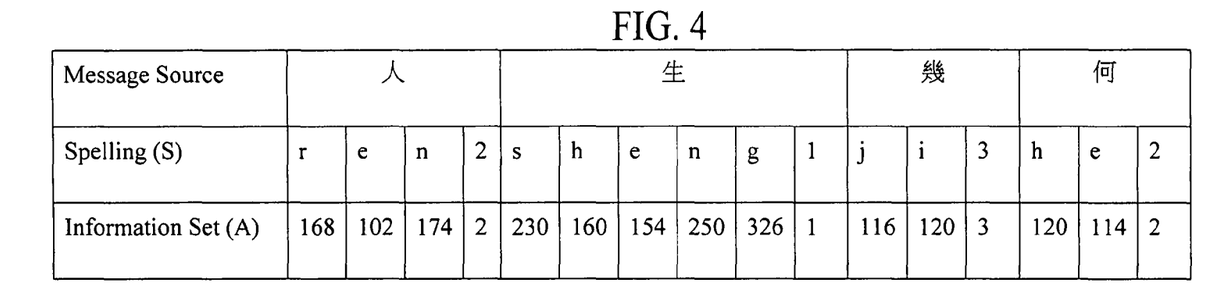
FIG. 4 is an example illustrating the message source formed in Chinese character and converted into English alphabets.

Statistical analysis can decipher various kinds of codes because there is still certain leeway therein. However, the problem of leeway does not exist in the double-key cipher system. As shown in FIG. 4, an example illustrates the message source formed in Chinese character and converted into English alphabets.

It is worth mentioning that the message source can be any kind of language as long as it can be spelled into English alphabets. As shown in FIG. 4, the letter "e" has several kinds of expression (102, 154, 114). On the other hand, different letters such as i and h have identical expression of 120. Thus, this arrangement will totally disturb statistical regularity and conceal the regularity of repetition of the cipher's length, so that the private key also loses its statistical regularity.

Theoretically, the number of private key N is not limited as well as w, so there are unlimited numbers of expressions in the cipher. On the contrary, w can represent any letter as illustrated above so this is a cryptographic system with the functions of split and confidentiality. There is no leeway in this double-key cryptographic system which can not be deciphered by statistical analysis or attack by the regularity of the system.

Generally speaking, to decipher the double-key cryptographic system is equal to solve an equation as $N=p+q+p_1$, wherein only $p_1$ is known while the other three are unknown. The length of the cipher can be randomly arranged based on the combination of $p_1$ and N. When N is unlimited, w is consequently unlimited and so is the length of the cipher. Thus, the length of the cipher is not repetitive. Furthermore, there is no leeway in the cipher so it is unlikely to decipher the double-key cryptographic system by the regularity thereof.

Double-key cryptographic system is basically a one-way polynomial function, which has its own mathematical regularity and might be deciphered by some mathematical means. It is easy to get w by adding to prime numbers p and q, but factoring w into p and q is difficult because it is a one-way function of uncertain solutions. It is difficult to factorize w when it is big because p and q are required to be odd prime numbers. Based on Goldbach's conjecture, the numbers of combination of (p, q) can be derived by:

$$Z_w(w) = Z_{p,q}(w) + 2Z_a(w) \tag{1.1}$$

$$Z_{p,q}(w) = w + 1 + \sum_{\substack{l+m \le n \\ l,m \ge 0}} (-1)^{l+m} \sum_{\substack{1 \le j_1 < \ldots < j_l \le n \\ 1 \le j_1 < \ldots < j_{jm} \le n}} \left[ \frac{w - r_{j_1 \ldots j_m}^{j_1 \ldots j_l}}{p_{i_1} \cdots p_{i_l} \cdots p_{j_m}} + 1 \right] - 2A_{w-1} \tag{1.2}$$

and here, $p_1=2, 3, \ldots, p_n$, $n=\sqrt{w}$, $p_1=2$, $Z_a(w)$ is the number of the combination pairs of (p, q) in the interval of $[0, \sqrt{w}]$. $A_{w-1}$ $$A_{w-1} = \begin{cases} 1, & \text{if } w-1 \text{ is prime number} \\ 0, & \text{if } w-1 \text{ is non-prime number} \end{cases} r_{j_1 \wedge j_m}^{j_1 \wedge i_l}$$

is the solution of the below equation between the interval $[0,w]$ $$\begin{cases} x \equiv 0 \pmod{p_{i_1} p_{i_2} \wedge p_{i_l}} \\ x \equiv w \pmod{p_{j_1} p_{j_2} \wedge p_{j_m}} \end{cases} \tag{1.3}$$

The lower boundary of $Z_w(w)$ is $Z_w'(w)$, which is defined as $$Z_w'(w) = \lfloor \pi(\sqrt{w}) - 1 \rfloor + B_{w-x} \tag{1.4}$$

$$B_{w-1} = \begin{cases} j, & \text{when } x = q_j, \text{ take number of } j \text{ from } q_j \\ 1, & \text{when } x = 1, \text{ take } 1 \end{cases}$$

The number of $Z_w(w)$ increases with the increase of w. Furthermore, the number of $Z_w(w)$ is random. In a general cryptographic system, this feature does not exist.

As to complexity of the algorithm, measuring by the maximum time (T) and storage space (S) required by the algorithm. Time is linear while the length of data is exponential. If $T=(2^n)$ and $n=10^6$, it takes $3 \times 10^{301016}$ years to complete the computation.

The double-key cryptographic system is advantageous about the symmetry between encryption and decryption so as to facilitate the use of cryptographic devices. Unlike typical cryptographic systems, the present invention does not need a pre-communication cipher K of a secure channel and thus increases the degree of security in public-key cryptographic systems. In contrast to huge amount of computation in public-key cryptographic system (which is about 154 digits), the present invention has significantly reduce the amount of computation which is about 20 digits.

Figure 1:
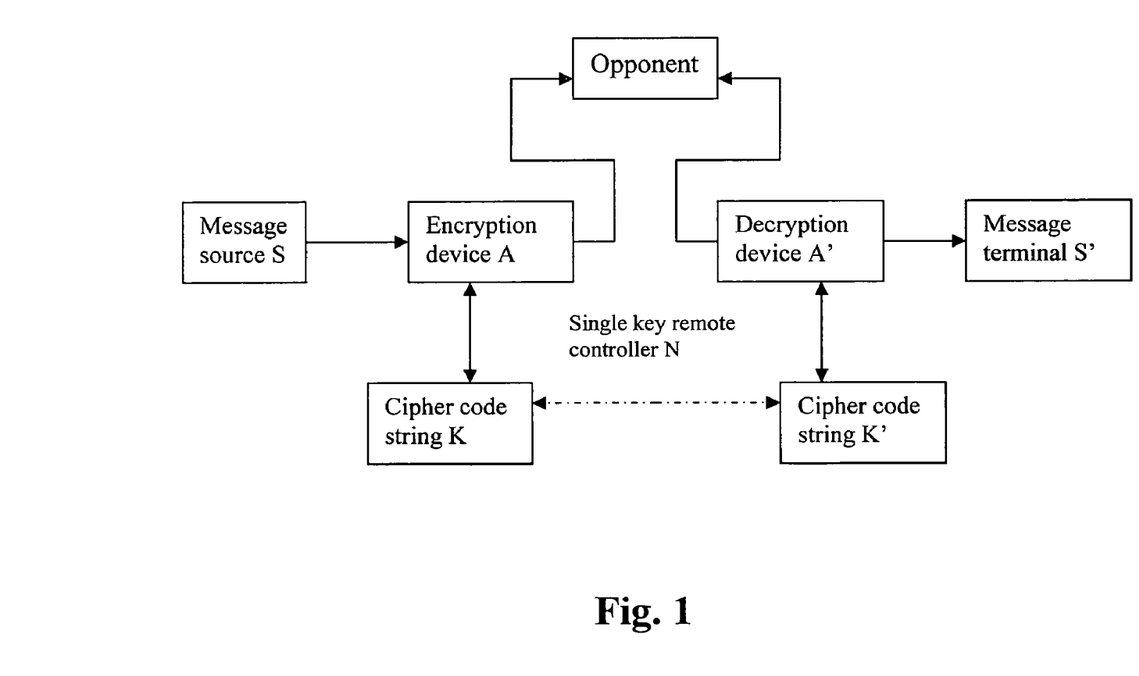
FIG. 1 is a block diagram illustrating a flow of the method for generating a pair of public key and secret key from a message source to a message terminal according to a preferred embodiment of the present invention.

As can be seen in FIG. 1, the cryptographic system comprises a limited set S which consists of all possible message resources, a limited set A comprising all information labels, and a limited set K comprising all possible double keys. In order to transmit a message, the sender and the receiver secretly pick up an identical private key N and a public-key $p_1$, and both get a random cipher string K, comprising $k_1, k_2, k_3, \ldots, k_r$ based on the computation of $p_1$ and N. The sender then send the limited set A with all information labels to the receiver who subsequently conducts a counter computation according to the random cipher string K to get the cipher in the limited set S.

Figure 5:
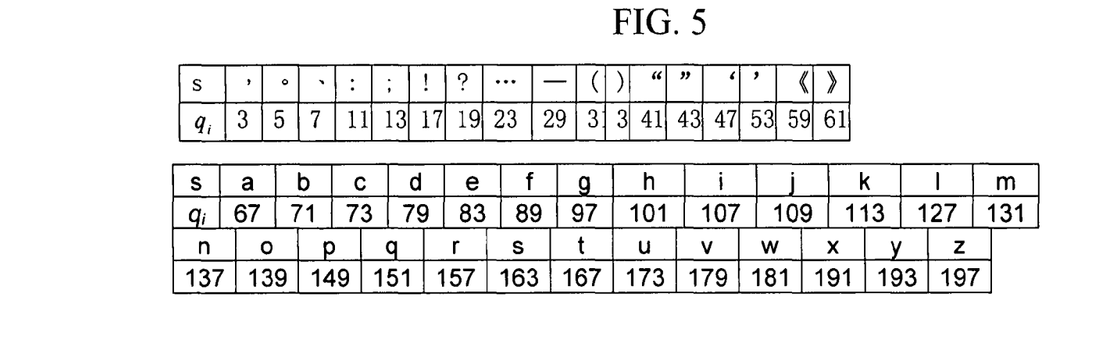
FIG. 5 illustrates a transformation from a character to a prime number according to the above preferred embodiment of the present invention.

According to the example stated above, the limited set S comprises the message source of Chinese characters "人生幾何" which are transformed to English spellings as "ren2 sheng1 ji3 he2" by so-called a "Chinese character spelling transformer." Every single character in set S, including punctuation, is transformed into a prime number q, according to FIG. 5. Transformation from a character to a prime number is done by so-called character-digitalized transformer.

Figure 6:
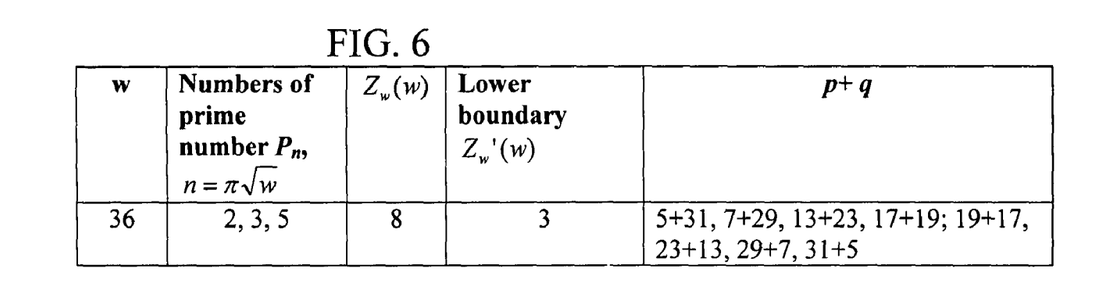
FIG. 6 illustrates Goldbach's conjecture according to the above preferred embodiment of the present invention.
Figure 7:
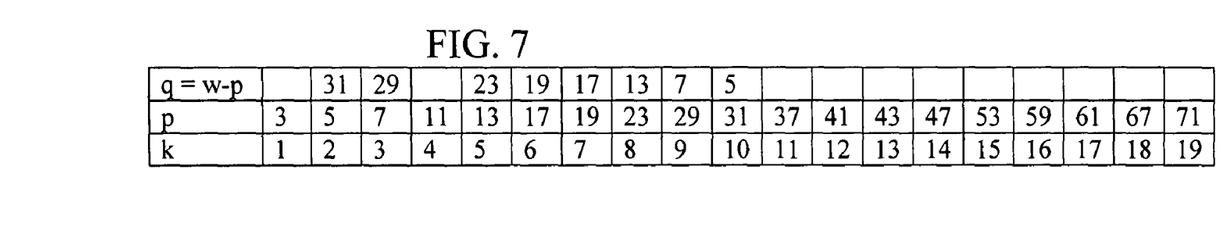
FIG. 7 illustrates the cipher codes k corresponding to p and q obtained in FIG. 6 according to the above preferred embodiment of the present invention.

Based on Goldbach's conjecture, every odd number N ($N \ge 9$) is the sum of three odd prime numbers, namely $N=p+q+p_1=w+p_1$ as illustrated above. If $N=49$, $p_1=13$, then $w=49-13=36$. According to formulas provided above, the calculation results are illustrated in FIG. 6. FIG. 7 illustrates the cipher codes k corresponding to p and q obtained in FIG. 6, such that a cipher code set K is generated, comprising cipher code string $k_1, k_2, \ldots, k_r$ which is (2, 3, 5, 6, 7, 8, 9, 10) in the present example. The device which can generate above cipher code string is called "cipher code string generator."

As shown in FIG. 7, if $N=49$, $p_1=13$, and $w=49-13=36$, the numbers of pairing between the N and $p_1$ can be substantially increased. Accordingly, there are nineteen pairs of w to bridge between N and $p_1$. Therefore, even though one of the keys N, $p_1$ is known, another keys $p_1$, N, cannot be determined through w within a short period of time. In other words, by using two numerical characters, millions of pairs as quoted as w are formed to bridge the two numerical characters. Having one of the keys N, $p_1$ being known, another keys $p_1$, N, may take years to be found out through millions of combinations of w.

In other words, the cipher code set is an integer set from 1 to infinity sorted in an order manner. As shown in FIG. 7, the first prime number p, which is a prime number, is starting from 3, 5, 7, 11, 13, 17, and so on. The cipher code string k is starting from 1, 2, 3, and so on. However, the values of the cipher code string k match the value of w by summing p and q are value 2 (in which p=5 and q=31), value 3 (in which p=7 and q=29), value 5 (in which p=13 and q=23), value 6 (in which p=17 and q=19), value 7 (in which p=19 and q=17), value 8 (in which p=23 and q=13), value 9 (in which p=29 and q=7), and value 10 (in which p=31 and q=5). Therefore, the cipher code string $k_1, k_2, \ldots, k_r$ is (2, 3, 5, 6, 7, 8, 9, 10).

When w ranges from 6 to $10^{20}$, $Z_w(w)$ in formula (1.1) and (1.2) based on Goldbach's conjecture can generate corresponding combinations of p and q, which can be stored in so-called a Goldbach's conjecture number storage tank operated by some computation software.

Figure 8:
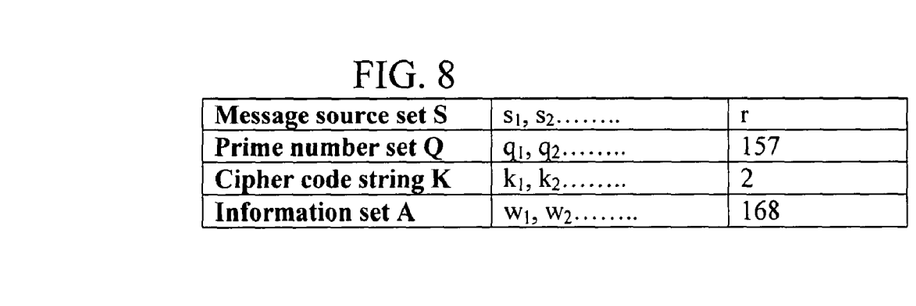
FIG. 8 illustrates the conversion of the prime number set Q according to the above preferred embodiment of the present invention.
Figure 9:
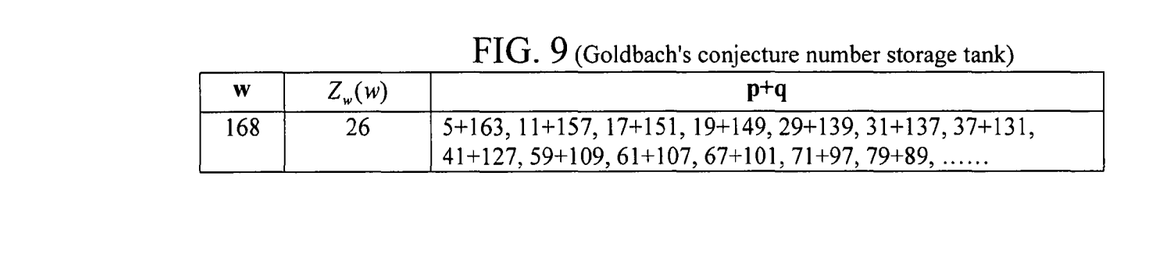
FIG. 9 illustrates the encryption of the system according to the above preferred embodiment of the present invention.

As to an example of encryption, the sender transforms the limited set S into prime number set Q and each prime number q has its corresponding cipher code string number k. w is picked from the Goldbach's conjecture number storage tank. The encryption process is illustrated according to FIG. 8 and FIG. 9. The information set A thus comprises cipher codes 168 102 174 2 230 160 154 250 326 1 116 120 3 120 114 2.

The hardware accomplished the above computation is called an encryption device.

After receiving the public key $p_1$=13 and the cipher codes (168 102 174 2 230 160 154 250 326 1 116 120 3 120 114 2), one can decipher starting from public key $p_1$=13 and private key N=49, and generate cipher code string set K according to the Goldbach's conjecture number storage tank, namely reverses from set A to set S to obtain the combination of English characters "ren2 sheng1 ji3 he2," which will be easily translated to Chinese as "人生幾何."

Figure 2:
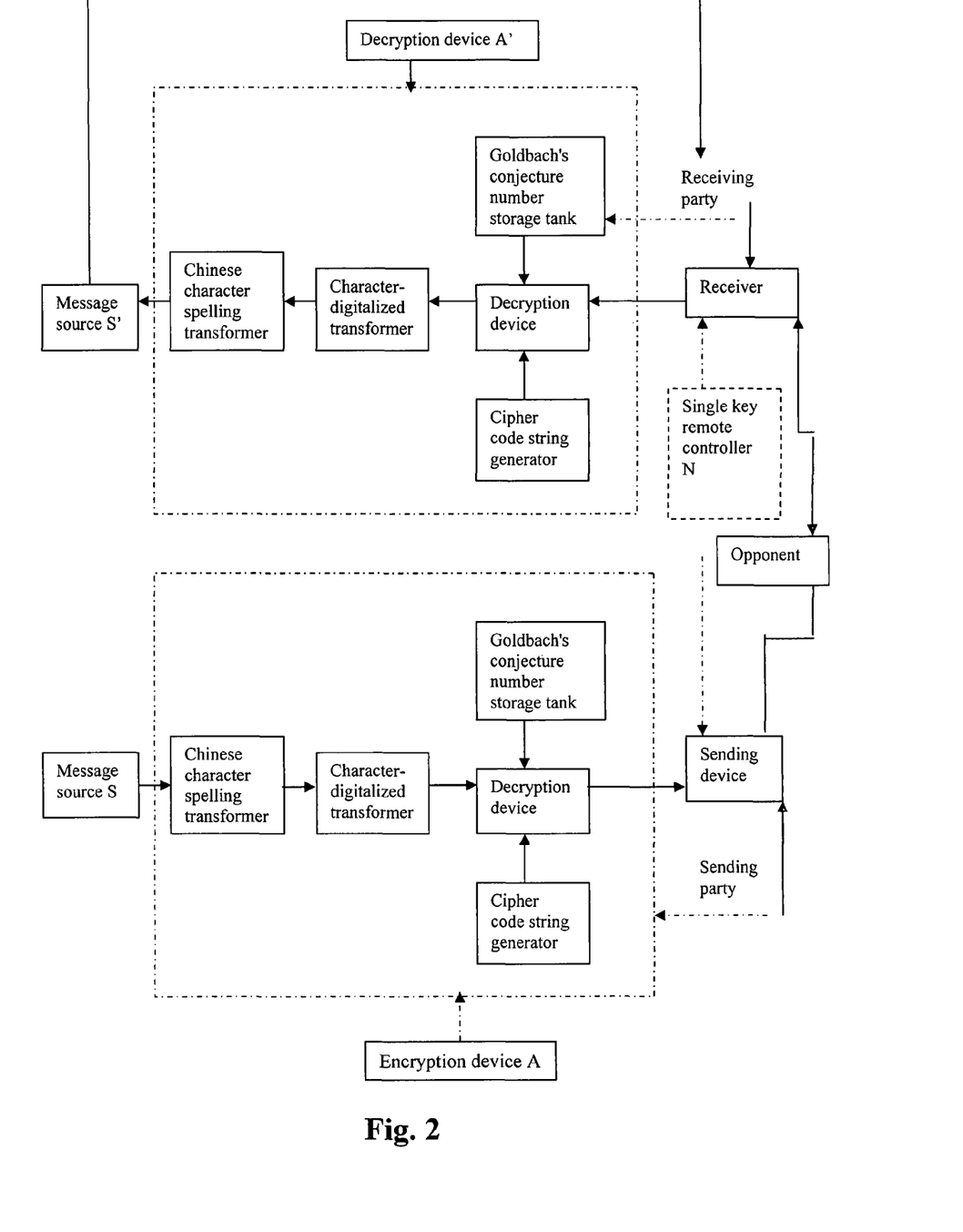
FIG. 2 is a block diagram of a system for generating a pair of public key and secret key according to the above preferred embodiment of the present invention.

As shown in FIG. 2, the computing device comprises (1) the Chinese character spelling transformer and (2) the character-digitalized transformer. An identification verifying encrypted device comprises (3) cipher code string generator, (4) Goldbach's conjecture number storage tank, and (5) encryption/decryption device. Since encryption and decryption are symmetric in the present invention, an identification verifying decrypted device comprises the identical devices from (1) to (5), but in reverse order.

Generally speaking, the present invention of double-key cryptographic system has the advantage of:

(1) High security—there is no leeway in the cryptographic system in the present invention and the cipher code string is so random and confidential. If one wants to decipher the cipher code string in the present invention, it is equal to solve an equation such as N=p+q+$p_1$ with three unknowns (only $p_1$, the public key, is known) and it is hardly achievable in a limited time. As to the confidentiality of the private key N, given w=$10^{20}$, if every 1000 people owns one cryptographic device, the possibility of repetition of N is about $$\frac{1}{7.69 \cdot 10^{12}}.$$

(2) Special functions—the double-key cryptographic device enables that one may not have to keep confidential of his/her own password (public key $p_1$) because every person has his/her own private key N corresponding to the bank account, and thus even though the personal password is stolen, the money in the bank is still protected by the private key N. As stated above, the possibility of repetition of N is about $$\frac{1}{7.69 \cdot 10^{12}}.$$

In addition, this system can be adapted for personal identification and password so that one may not have to bring cash and can purchase things through the private key N as a password in the present invention. This cryptographic system can be adapted for communications in business, internet, confidentiality . . . etc. When someone tries to break into this system, the cipher code can be frozen or the message can be invalidated based on the principle in the present invention that $p_1$ must be smaller than N.

In a preferred embodiment, when a customer opens a bank account, the customer is given a private key (or secret key) and a public key determined by the customer himself and keyed into the bank computer and the bank officer does not deal with the public key. Therefore, the customer is able to withdraw the money from the bank by inputting the secret key and the public key as normal. The double-key cryptographic system then generates a cipher code string, namely a cipher code string, based on the number of the private key and the public key. Some people might use the same public key, but they are given two different private keys so that the cipher codes 30 generated by the cryptographic system are different for each bank customer. Even if the public key was known by other people, the customer's bank account is still protected by the private key and the cipher code string. Furthermore, the bank officer does not know the secret key which is determined solely by the customer so the bank teller is not able to fraudulently transfer the customer's money from his account. In other words, even though the bank officer knows the public key and the cipher code string, the bank officer is unable to determine the secret key from the public key and the cipher code string by decoding the cipher code string. Therefore, the secret key is definitively undetermined by conjecturing the public key even though the public key is known. In addition, when a computer hacker illegally enters into a network of the bank and steals the cipher code string, the computer hacker is unable to solve the cipher code string to determine the secret key even though the public key is known.

Based on the theory in the present invention that the number of the public key must be smaller than the private key, and if the cryptographic system detects that the public key is equal or larger than the private key, the computation will be frozen. Thus, if the customer does not feel safe regarding either the public key or the private key, he can change the public key to a larger number and if the system detects that the new public key is larger than the private key, the computation of this customer's account will be frozen and he can reset his public and private keys again.

Alternatively, one can add a "private-key transformer" which means when the customer's bankbook, password (public key) and identification card are stolen or robbed, the bank teller can identify bank customers by asking for their identification cards. So even the customer's bankbook, password (public key) and identification card are stolen or robbed, the thieve or robber cannot obtain money from the customer's bank.

Figure 3:
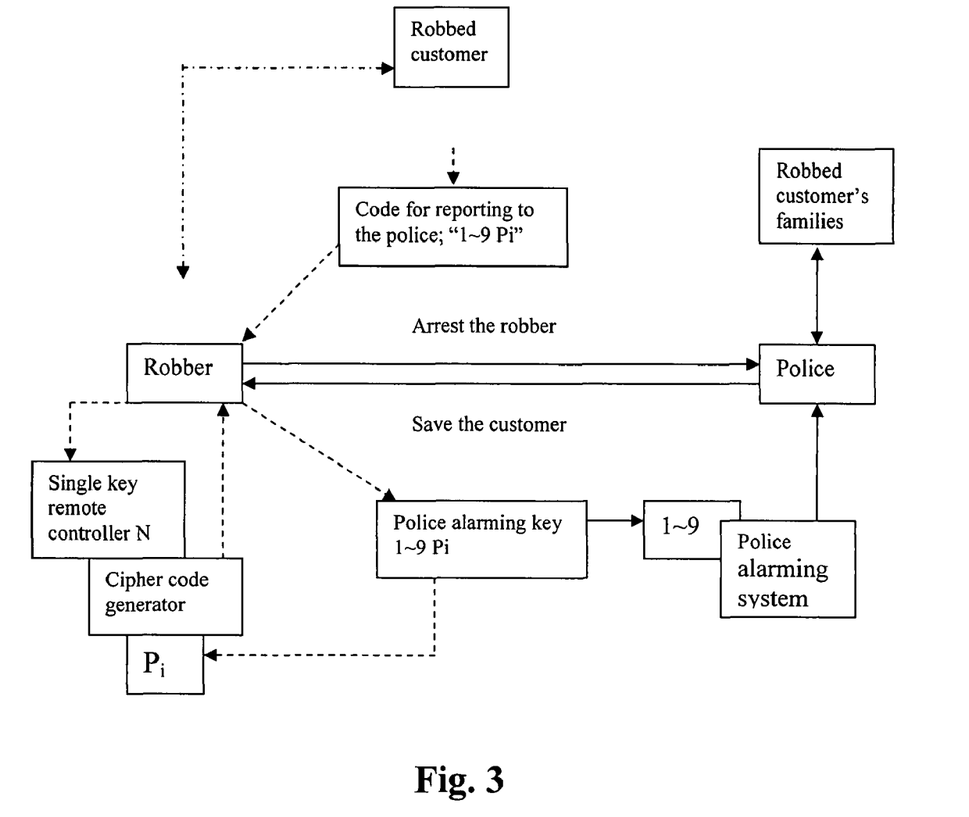
FIG. 3 illustrates an example of the system incorporating a police-alarming transformer according to the above preferred embodiment of the present invention.

As shown in FIG. 3, the customer can set up a "police-alarming transformer" which simply adds a non-zero number before the public key and when this special-designed number is entered, the system alarms the police and shows the police where the money is withdrawn. When the customer is forced to give his password (public key) to the robber, he can give the robber the password with the alarm transformer so that when the robber obtains the money from the ATM machine, the police can roughly locate and then effectively arrest the robber.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of generating a pair of public key and secret key in a cryptographic system through a computing device, comprising the steps of:
    (a) selecting a public key $p_1$ in said computing device, wherein said public key $p_1$ is a prime number;
    (b) selecting a secret key N in said computing device, wherein said secret key N is larger than said public key $p_1$;
    (c) computing a heavy main number w in responsive to said public key $p_1$ and said secret key N, wherein w is an even number, wherein said w is calculated by $N-p_1$;
    (d) factoring said heavy main number w by the steps of:
    (d.1) selecting a first prime number p; and
    (d.2) determining a second prime number q in responsive to said first prime number p to form a combination of $$\binom{p}{q}$$

in condition that a sum of said first and second prime numbers p, q equals to said heavy main number w, wherein each of said first and second prime numbers p, q is an odd prime number;
    (e) pairing said secret key N with said public key $p_1$ in terms of said heavy main number w to generate a unique combination of said secret key N and said public key $p_1$, such that said secret key N is definitively undetermined by conjecturing said public key $p_1$ even though said public key $p_1$ is known; and
    (f) providing said public key $p_1$ and said secret key N with said unique combination in terms of said heavy main number w to said cryptographic system.

2. The method, as recited in claim 1, wherein, the step (b), said secret key N is selected in condition that said secret key N must be equal or larger than 9.

3. The method, as recited in claim 1, wherein, the step (b), said secret key N is selected in condition that said secret key N is an odd number.

4. The method, as recited in claim 2, wherein, the step (b), said secret key N is selected in condition that said secret key N is an odd number.

5. The method, as recited in claim 1, wherein, the step (d.1), said first prime number p is selected in condition that said heavy main number w is larger than said first prime number p and is larger than said second prime number q, wherein said first prime number p is starting from 3 in an ascending order.

6. The method, as recited in claim 4, wherein, the step (d.1), said first prime number p is selected in condition that said heavy main number w is larger than said first prime number p and is larger than said second prime number q, wherein said first prime number p is starting from 3 in an ascending order.

7. The method as recited in claim 1, in said step (b), further comprising a fault step of generating an error of said method when said secret key N is set with a value smaller than said public key p.

8. The method as recited in claim 6, in said step (b), further comprising a fault step of generating an error of said method when said secret key N is set with a value smaller than said public key p.

9. The method, as recited in claim 1, wherein between said step (d) and (e), further comprises a step of generating a cipher code string k from a cipher code set in response to said first and second prime numbers p, q, wherein said cipher code string k is an integral order number representing a corresponding combination of said first and second prime numbers p, q in an order manner, wherein each of said secret key N, said public key $p_1$, said heavy main number w, said first and second prime numbers p, q, and said cipher code string k is a non-zero positive integer, wherein said cipher code set is an integer set from 1 to infinity sorted in an ordered manner.

10. The method, as recited in claim 8, wherein between said step (d) and (e), further comprises a step of generating a cipher code string k from a cipher code set in response to said first and second prime numbers p, q, wherein said cipher code string k is an integral order number representing a corresponding combination of said first and second prime numbers p, q in an order manner, wherein each of said secret key N, said public key $p_1$, said heavy main number w, said first and second prime numbers p, q, and said cipher code string k is a non-zero positive integer, wherein said cipher code set is an integer set from 1 to infinity sorted in an ordered manner.

11. A system for generating a pair of public key and secret key in a cryptographic system, comprising:
    a key provider providing a public key $p_1$ and a secret key N, wherein said secret key N is larger than said public key $p_1$, wherein said public key $p_1$ is a prime number and is smaller than said secret key N; and
    a computing device generating a heavy main number w in responsive to said public key $p_1$ and said secret key N, wherein said w is calculated by $N-p_1$, wherein said heavy main number w is factored into first and second prime numbers p and q to form a combination of $$\binom{p}{q}$$

and in such a manner that a sum of said first and second prime numbers p, q equals to said heavy main number w, wherein each of said first and second prime numbers p, q is an odd prime number; wherein said secret key N is paired with said public key $p_1$ in terms of said heavy main number w to generate a unique combination of said secret key N with said public key $p_1$ to said cryptographic system, such that said secret key N is definitively undetermined by conjecturing said public key $p_1$ even though said public key $p_1$ is known.

12. The system, as recited in claim 11, wherein said secret key N is provided by said key provider in condition that said secret key N must be equal or larger than 9 and must be an odd number.

13. The system, as recited in claim 12, wherein said heavy main number w is larger than said first prime number p and is larger than said second prime number q, wherein said first prime number p is starting from 3 in an ascending order.

14. The system, as recited in claim 13, further comprising a cipher code generator generating a cipher code string k from a cipher code set in response to said first and second prime numbers p, q, wherein said cipher code string k is an integral order number representing a corresponding combination of said first and second prime numbers p, q in an order manner, wherein each of said secret key N, said public key $p_1$, said heavy main number w, said first and second prime numbers p, q, and said cipher code string k is a non-zero positive integer.

15. The system, as recited in claim 14, further comprising an error indicator indicating there is an error for generating a heavy main number w when said secret key N is set with a value smaller than said public key $p_1$.

* * * * *